United States Patent
Avidor et al.

(10) Patent No.: US 10,013,468 B2
(45) Date of Patent: Jul. 3, 2018

(54) MULTIVARIABLE OBJECTS NAVIGATION TOOL

(71) Applicant: Twiggle Ltd., Tel-Aviv (IL)

(72) Inventors: Adi Avidor, Tel-Aviv (IL); Amir Konigsberg, Tel-Aviv (IL)

(73) Assignee: Twiggle Ltd., Tel-Aviv (IL)

( * ) Notice: Subject to any disclaimer, the term of this patent is extended or adjusted under 35 U.S.C. 154(b) by 109 days.

(21) Appl. No.: 14/882,689

(22) Filed: Oct. 14, 2015

(65) Prior Publication Data
US 2017/0109410 A1    Apr. 20, 2017

(51) Int. Cl.
*G06F 17/30* (2006.01)

(52) U.S. Cl.
CPC .. *G06F 17/30554* (2013.01); *G06F 17/30864* (2013.01)

(58) Field of Classification Search
CPC .......... G06F 17/30864; G06F 17/3053; G06F 17/30705; G06F 17/30713; G06F 17/30707; G06F 17/30867; G06F 17/30899; G06F 3/0482; G06F 17/30395; G06F 17/30554; G06F 17/30572; G06F 3/04842; G06F 3/0484; G06Q 30/02; Y10S 707/99933; Y10S 707/99937; G01K 1/08; G01K 7/04
See application file for complete search history.

(56) References Cited

U.S. PATENT DOCUMENTS

| | | | | |
|---|---|---|---|---|
| 7,752,077 B2* | 7/2010 | Holden | ............. | G06Q 30/06 705/26.1 |
| 7,773,812 B2* | 8/2010 | Hanus | ............. | G06F 17/3053 382/181 |
| 8,484,099 B1* | 7/2013 | Pope | ............. | G06Q 30/0278 705/26.7 |
| 8,620,891 B1* | 12/2013 | Thirumalai | ....... | G06F 17/30867 707/705 |
| 2004/0019536 A1* | 1/2004 | Ashkenazi | ......... | G06Q 10/087 705/26.64 |
| 2012/0284105 A1* | 11/2012 | Li | ............. | G06Q 30/06 705/14.23 |

* cited by examiner

*Primary Examiner* — Shew-Fen Lin

(57) ABSTRACT

A method of adapting a GUI that comprises selecting a group of multivariable objects which comply with a search query from a plurality of multivariable objects, each the plurality of multivariable object is defined by a plurality of object variable values each of one of a plurality of object variables, for each one of the plurality of object variables, calculating a plurality of difference values each defines a difference between a first object variable value of one of the group of multivariable objects and a second object variable value of another of the group of multivariable objects, identifying a set of differentiating object variables from the plurality of object variables according to an analysis of the plurality of difference values of each one of the plurality of object variables, and updating a GUI accordingly.

17 Claims, 8 Drawing Sheets

MULTIVARIABLE OBJECTS NAVIGATION TOOL

RELATED APPLICATION

This application is related to co-filed application Ser. No. 14/882,679 titled "SYSTEMS AND METHODS FOR NAVIGATING A SET OF DATA OBJECTS" ,by at least some of the same inventors, and assigned to the same entity.

BACKGROUND

The present invention, in some embodiments thereof, relates to data presentation and, more specifically, but not exclusively, to iterative data presentation that is adapted to according to user inputs.

Product and service searches are currently used to search for products or services on a computer network, such as the Internet. Typically a user inputs search criteria, such as a phrase, a word, a combination of words, etc. into a search engine or selects one or more categories or sub categories. Searches may be conducted using a natural language style, a Boolean logic style, a pre-prepared search form, and the like. Searches using a search engine typically produce search results in the form of a results list that include a large number of entries. Often a user may look at only few search results which appear first. Valuable entries in the results list may be missed by a user because the entries are scattered among a large number of entries in the results list. Moreover, the ranking (or sorting) of results is widely recognized as being an important factor determining the usefulness of results.

SUMMARY

According to some embodiments of the present invention, there is provided a method of adapting a graphical user interface (GUI) that presents response to a search query on a display of a client terminal based in real time. The method comprises selecting a group of multivariable objects which comply with a search query from a plurality of multivariable objects, each the plurality of multivariable object is defined by a plurality of object variable values each of one of a plurality of object variables, for each one of the plurality of object variables, calculating a plurality of difference values each defines a difference between a first object variable value of one of the group of multivariable objects and a second object variable value of another of the group of multivariable objects, identifying a set of differentiating object variables from the plurality of object variables according to an analysis of the plurality of difference values of each one of the plurality of object variables, and updating a GUI to present a plurality of indications each associated with one of the plurality of multivariable objects and with respective the object variable values of the plurality of difference values.

Optionally, each one of the plurality of object variables is associated with a weight; wherein the identifying takes into account respective the weight.

Optionally the method further comprises identifying a user selection indicative of at least a portion of the plurality of indications and refining the search query accordingly. Further comprising repeating the calculating a plurality of difference values, the identifying a set of differentiating object variables, and the updating a graphical user interface with the refined search query instead of the search query.

More optionally, the user selection is a single click or finger tap on one of a plurality of selectable items which are presented on the display to represent the plurality of multivariable objects.

Optionally, the search query is inputted by a user using the GUI.

Optionally, the multivariable objects are of a common product category.

Optionally, the object variables define a product in a product category.

Optionally, the object variables define a service in a service category.

Optionally, the method further comprises receiving the search query a user via a search engine interface which is presented to the user; wherein the GUI is presented to the user in response to the search query.

Optionally, the method further comprises receiving the search query is received from a software module which selects the plurality of multivariable objects for comparison; wherein the GUI is presented to a user accessing a webpage associated with the software module.

Optionally, the method further comprises receiving the search query is received from an advertisement server which generates a graphical element with the plurality of multivariable objects and posts the graphical element in a webpage in response to a match with characteristics of a browsing user or a content in the webpage; wherein the GUI of the graphical element and presented when the webpage is accessed to using a browser.

Optionally, the GUI presents each of the plurality of difference values with positivity indications to indicate a negative value or a positive value to a respective multivariable object.

Optionally, the plurality of indications are selectable items which allow a user to redefine the search query by adding to or removing from the search query a respective the differentiating object variable.

Optionally, the GUI is rendered by a browser executed on a client terminal of a human user.

According to some embodiments of the present invention, there is a system of generating a graphical user interface (GUI) that presents response to a search query on a display of a client terminal based in real time. The system comprises an interface adapted to receive a search query from a user, at least one processor, a memory hosting a code, wherein the following code instructions of the code are executed by the at least one processor: code instructions for selecting a group of multivariable objects which comply with a search query from a plurality of multivariable objects, each the plurality of multivariable object is defined by a plurality of object variable values each of one of a plurality of object variables, code instructions for calculating, for each one of the plurality of object variables, a plurality of difference values each defines a difference between a first object variable value of one of the group of multivariable objects and a second object variable value of another of the group of multivariable objects, code instructions for identifying a set of differentiating object variables from the plurality of object variables according to an analysis of the plurality of difference values of each one of the plurality of object variables, and code instructions for updating a GUI to present a plurality of indications each associated with one of the plurality of multivariable objects and with respective the object variable values of the plurality of difference values.

Optionally, the interface, the at least one processor, and the memory are of a server which communicate with a plurality of client terminals via a network.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
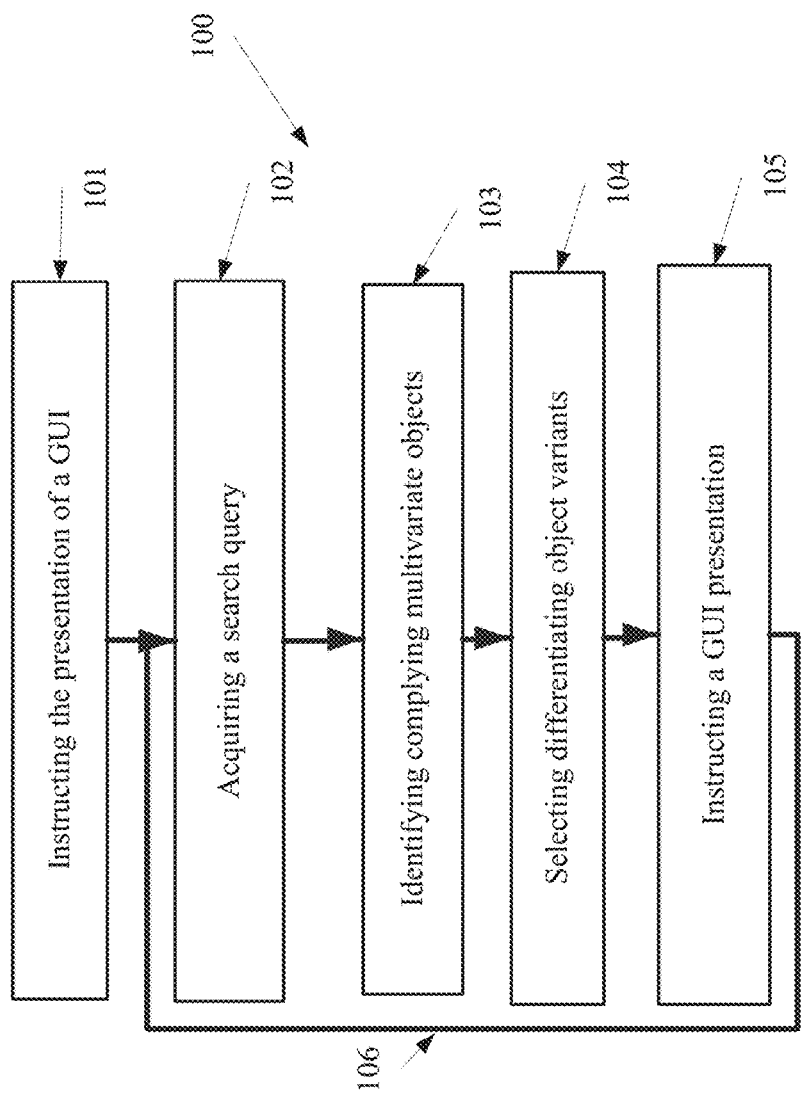
FIG. 1 is a flowchart of a method of adapting a graphical user interface which presents alternative multivariable objects of a certain category wherein each alternative multivariable object is presented with one or more object variables which differentiate it substantially from the other alternative multivariable objects, according to some embodiments of the present invention.

The present invention, in some embodiments thereof, relates to data presentation and, more specifically, but not exclusively, to iterative data presentation that is adapted to according to user inputs and/or search query terms.

According to some embodiments of the present invention, there are provided methods and systems for generating and/or updating a graphical user interface (GUI) by tagging or otherwise enhancing each of a plurality of multivariable object entries (e.g. graphical elements) of a response to a search query with indication(s) of values of one or more selected object variable(s). Each multivariable object entry represents a multivariable object that complies with the terms of the search query (for brevity may be referred to as complying with the search query. Each of the selected object variable(s) has a value that substantially differentiates one multivariable object from the others (entries and multivariable objects may be referred to intermittently). Optionally, values of object variables of multivariable objects which comply with a search query are analyzed for identifying a group of differentiating object variables. A differentiating object variable is optionally an object variable that a value thereof in one multivariable object is substantially different from corresponding value(s) of that the same object variable in other multivariable objects which are provided as response to a search query or the like. Example for substantial difference may be a relatively high variance indicator, for example a variance indicator such as a value distance or gap from other values, optionally above a threshold or more prominent than other variance indicators. Optionally, the differentiating object variables are optionally object variables exhibiting a high distance between a value associated with one multivariable object and the respective values of other multivariable objects which comply with a search query in relation to other object variables of the multivariable objects. The differentiating object variables reflect successfully a tradeoff in the selection of one product over another.

The GUI is optionally used to iteratively refining a search query by adding a value of a differentiating object variable to the search query (either as a positive or as a negative value). The graphical user interface includes a control with a plurality of selectable items each representing a value of another differentiating object variable, for example selectable items selected according to a single click, a tap, a gesture, and/or a sensor reading, for instance item selected based on location data, inventory sensor, temperature sensor and/or the like. A value and a range of values may be referred to herein interchangeably.

The above outlined methods and systems provide a technical solution to the problem of information overflow. Information about some products and services includes dozens, hundreds or even more values of different object variables. These values may include physical information about active components, size, shape and other physical characteristics of a certain product or service, provider information, accessories information, reviews data, and deduced information such as recommended usability and/or the like. The described embodiments provides a technical solution of dynamically identifying which object variables differentiate between selected multivariable objects and dynamically adapting a presentation of the selected multivariable objects to reflect these object variables. Optionally, varies product or service object variables are analyzed to identify the differentiating object variables, for instance various parameters which are extracted from product specification and relational and/or statistical data.

It should be noted that the above technical solution can be used to indicate which physical features (e.g. weight, size, release date, and suitability for difficult weather) and/or non-physical features (e.g. popularity, suitability of use, for example suitability for elderly population, suitability for attorneys, and suitability for tech guys) differentiate mostly between one product which comply with a search query and other products which comply with the same search query.

The above allows the user to refine his search query, for instance by adding a value of a differentiating object variable to the search query.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart 100 of a method of generating a GUI indicating values of object variables which differentiate between multivariable objects which comply with term(s) of a search query and/or similar to a user selected product or service, according to some embodiments of the present invention. The multivariable objects may be products or services which comply with any search query. The multivariable objects are optionally defined in multivariable object records of a database. Each such record documents values of object variables of one multivariable object.

The method allows selecting a group of object variables of multivariable objects which comply with terms of a search query (hereinafter also complies with a search query) and presenting their object variable values to allow a user to navigate between the various multivariable objects (e.g. products or services of a certain category) based on the differences between the various multivariable objects (products and services are referred to herein interchangeably).

As used herein an object variable is:

a quantifiable characteristic of a product or a service, for example weight, size, and durability, quantifiable characteristic of a part of the object (for example memory size, screen size, computer processing unit power, computer processing unit type, battery type and/or the like), suitability for a certain demographic segment or proficiency (e.g. suitability for lawyers, programmers and/or the like), and a level of a functionality of the object or a component thereof (for example power consumption, battery lifespan, and/or the like).

Example for a differentiating object variable or an object variable may be a price, a release date, a popularity value, a weight, a height, a width, a score, a quality and/or a usability object variables which are calculated based on user reviews or selections, for example as described in U.S. patent application Ser. No. 14/720,860 filed on 25 May 2015 and U.S. patent application Ser. No. 14/681,194 filed on 8 Apr. 2015 which are incorporated herein by reference.

Figure 2A:
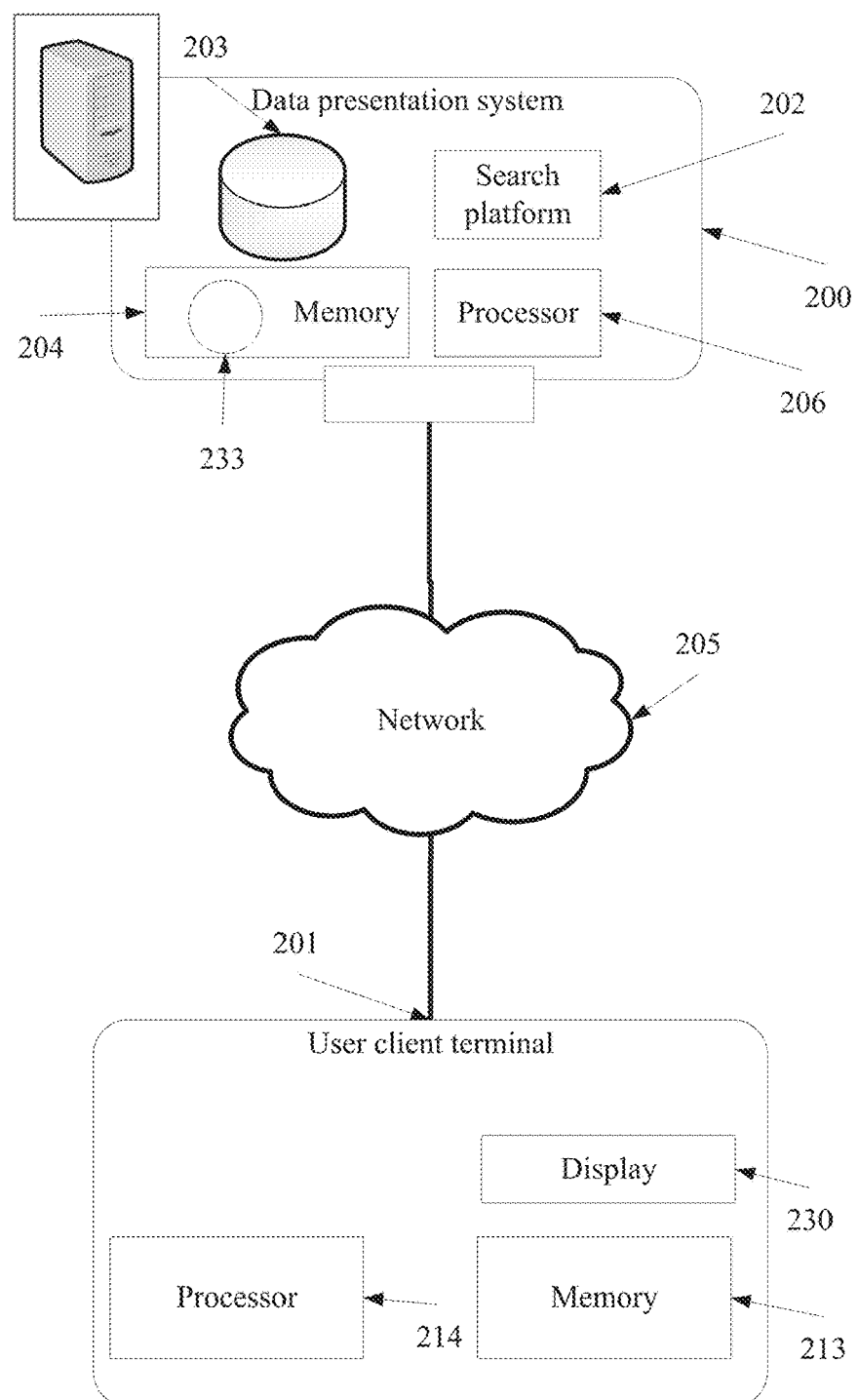
FIGS. 2A and 2B are schematic illustrations of system for implementing a method of adapting a graphical user interface as depicted in FIG. 1, according to some embodiments of the present invention.
Figure 2B:
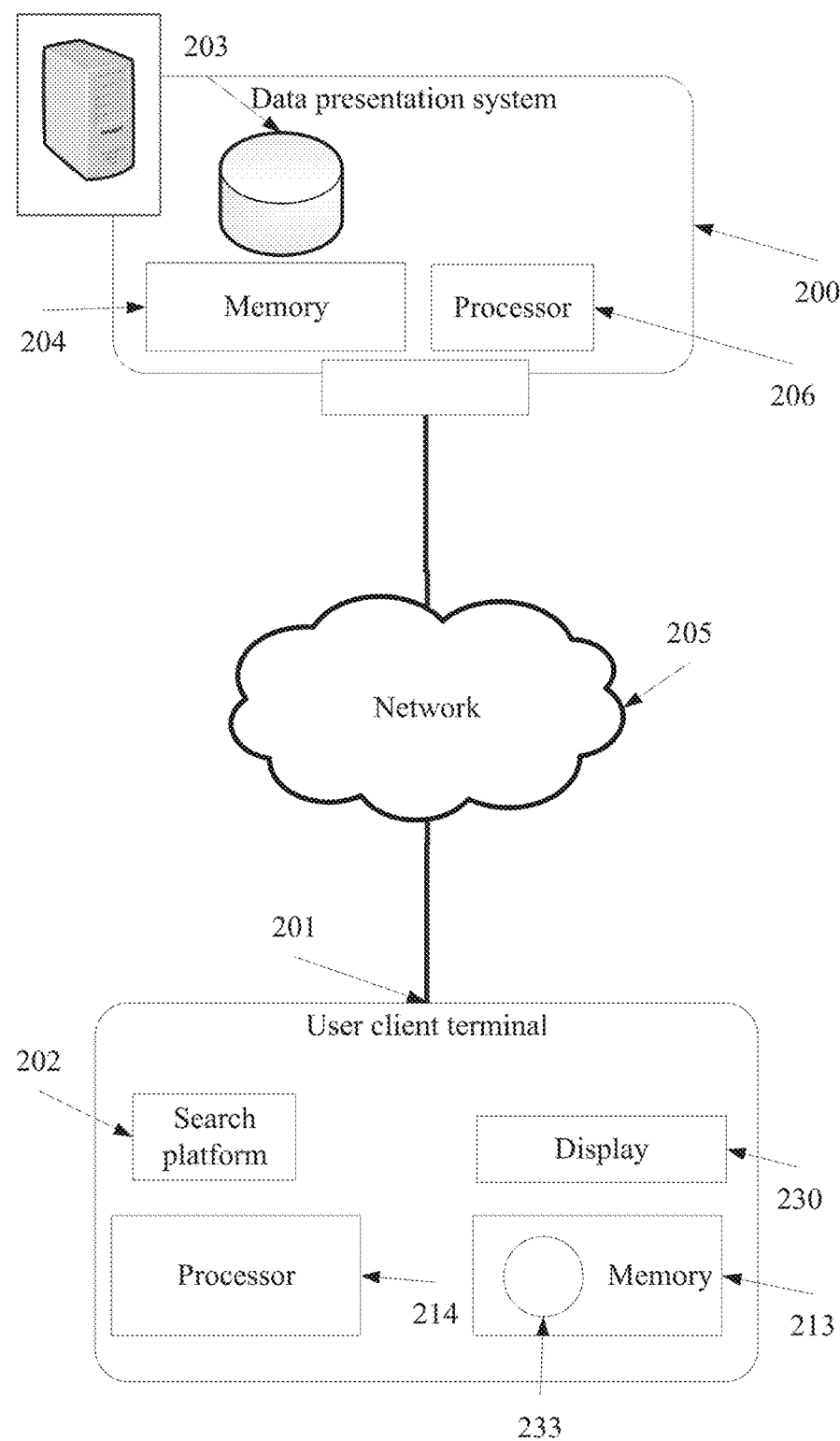

Reference is also made to FIGS. 2A and 2B each is a schematic illustration of system 200 for implementing a method of generating a GUI that dynamically presents data about differences between multivariable objects which comply with term(s) of a current search query and/or similar to a selected product, for example as depicted in FIG. 1, according to some embodiments of the present invention. The schematic illustration depicts the system 200 and a client terminal 201 rendering the above outlined GUI, according to some embodiments of the present invention. The data presentation system 200 may be implemented by one or more network nodes which are connected to a network 205 such as the internet, for example one or more servers, virtual machines (VMs) and/or the like. The GUI is optionally an interactive user interface rendered or otherwise displayed on a screen 230 of the client terminal, for instance by a browser executed on the client terminal. The client terminal 201 includes processor(s) 214 and a memory unit 213 for supporting the presentation of the GUI, for example by executing a browser, an add-on, and/or an application loading and rendering the GUI and identifies the user selections. The GUI optionally includes a field or another element for receiving from a user a search query, for instance as one or more words and/or by selecting product or service indication(s) and one or more fields or other UI elements for presenting multivariable objects which comply with the search query. The search query may be provided by a user or by any module or platform which selects products or services for comparison, for example, a discovery tool or an advertisement tool. The products which are compared may be any collection of similar products where in association with a presentation of a product image or product icon object variables which differentiate between multivariable objects are presented to assist user(s) to understand what are the main differences between the products. The search query may be any input to filters and/or sorting mechanism of an existing e-commerce site. In such embodiments, the results are presented with the differentiating object variables which are described herein.

In one example, the search query is received from an advertisement server which generates a graphical element (e.g. banner or a pane) with a plurality of multivariable objects, for instance products of a certain product category selected as matching characteristics of a browsing user or content in a webpage. In use, the advertisement server posts the graphical element in the webpage and the differentiating object variables of the multivariable objects are presented by the graphical element when the webpage is accessed to using a browser.

FIGS. 3A-3D are screenshots of an exemplary GUI which presents values of different differentiating object variables which selected as described in detail below. In each figure, the differentiating object variables are dynamically selected based on analysis of values of object variables of members of a different group of multivariable objects (e.g. products or services) which comply with a different search query, according to some embodiments of the present invention.

A product or a service may be represented by a selectable item such as a selectable icon, a selectable image, an interactive graphical object and/or any control that allows a user to select or define an object by one or more button presses, clicks, finger taps and/or gestures. For instance, a user may be presented with a plurality of selectable items, all indicative of one product or service which complies with a certain search query, and may browse to receive more information about the respective product or service by a click or a tap on one of the selectable items or a portion thereof. Each product or service, referred to as a multivariable object, is presented with values and optionally identifiers of the differentiating object variables. Object variables are object variables, such as weights, prices, lengths or multiple object variables each representing a combination of the object variables, for example a single object variable titled "Display" may be a combination of "Screen Diagonal", "number of Pixels per inch". In such embodiments, a value of this single object variable for each multivariable object is calculated by an equation taking the values of "Screen Diagonal", "number of Pixels per inch", and "Screen type" into account, optionally together with respective weights. This single object variable may be added to other object variables (e.g. regular or combination of object variables) or to more granular variables, to form the designated function.

The data presentation system 200 includes one or more processors 206 and a memory 204 for storing instructions for implementing a data presentation process and an differentiating object variable selection process based on products or services which comply with a current search query, for instance as depicted in FIGS. 3A-3D. The instructions for implementing a data presentation process and/or the differentiating object variable selection process, referred to herein as an differentiating object variable selection module 233, may be divided between a number of units, for example different servers of the system 200 and/or between the system 200 and the client terminal 201. The system 200 may include or be connected to a search platform 202, for example a search service of a website or a webpage. The system 200 may include or be connected to one or more databases 203 which store data, for example records or links, related to multivariable objects and values of the object variables. For example, a record may be stored as defined in U.S. Utility patent application Ser. No. 14/681,194 Filed on Apr. 8, 2015, which is incorporated herein by reference. According to some embodiments of the present invention, for example as depicted in FIG. 2B, the differentiating object variable selection module 233 is executed by the user client terminal 201. In such an embodiment, the multivariable objects or indications thereof are forwarded to the client terminal for differentiating object variables selection process by the ordering module 233. In such a manner, latency of selecting differentiating object variables is eliminated. The differentiating object variables selection module 233 may be a code or a script loaded with a webpage, such as a search engine webpage or a shopping webpage of a shopping website and/or a code running by an application installed at the client terminal. The application may be downloaded from an application store or temporarily installed as a widget in an accessed webpage.

In some embodiments, the system is used as a search platform for one or more databases of multivariable objects, such as databases of shopping websites and/or platforms. In such embodiments, values of object variables of multivariable objects which comply with a search query and/or part of user selected category and/or sub categories are identified and analyzed for identifying suitable differentiating object variables. This allows using the system for generating search results to a user input that indicates values of the features which differentiate between multivariable objects which comply with the search query. This allows emphasizing to the user one or more object variables of each of the complying multivariable object that differentiate the respective the complying multivariable object from the other the complying multivariable objects. In such embodiments, each multivariable object may be associated with purchase information and/or link.

The above mentioned systems and methods allow the user to view multivariable objects which comply with his needs together with information indicative of the most substantial differences therebetween.

As used herein, a client or a client terminal means a user that includes presentation means for presenting the GUI, for example a laptop, a desktop, Smart glasses, a smart watch, a tablet, a wearable device and/or the like. As used herein, a multivariable object is a product or a service which is offered for sale or rent and has more than one object variable.

Figure 3A:
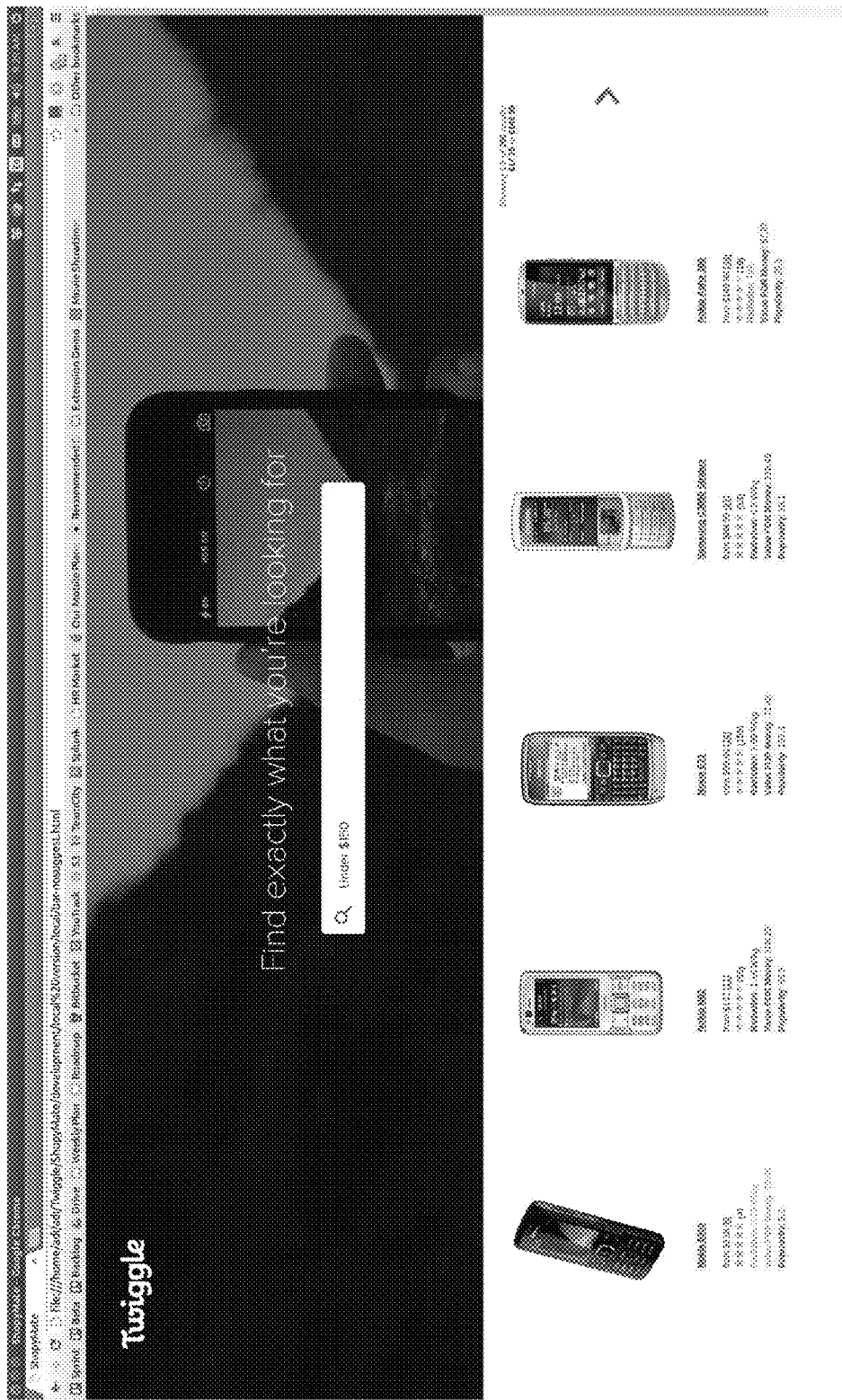
FIGS. 3A-3D are screenshots of an exemplary GUI which present values of differentiating object variables, according to some embodiments of the present invention.
Figure 3B:
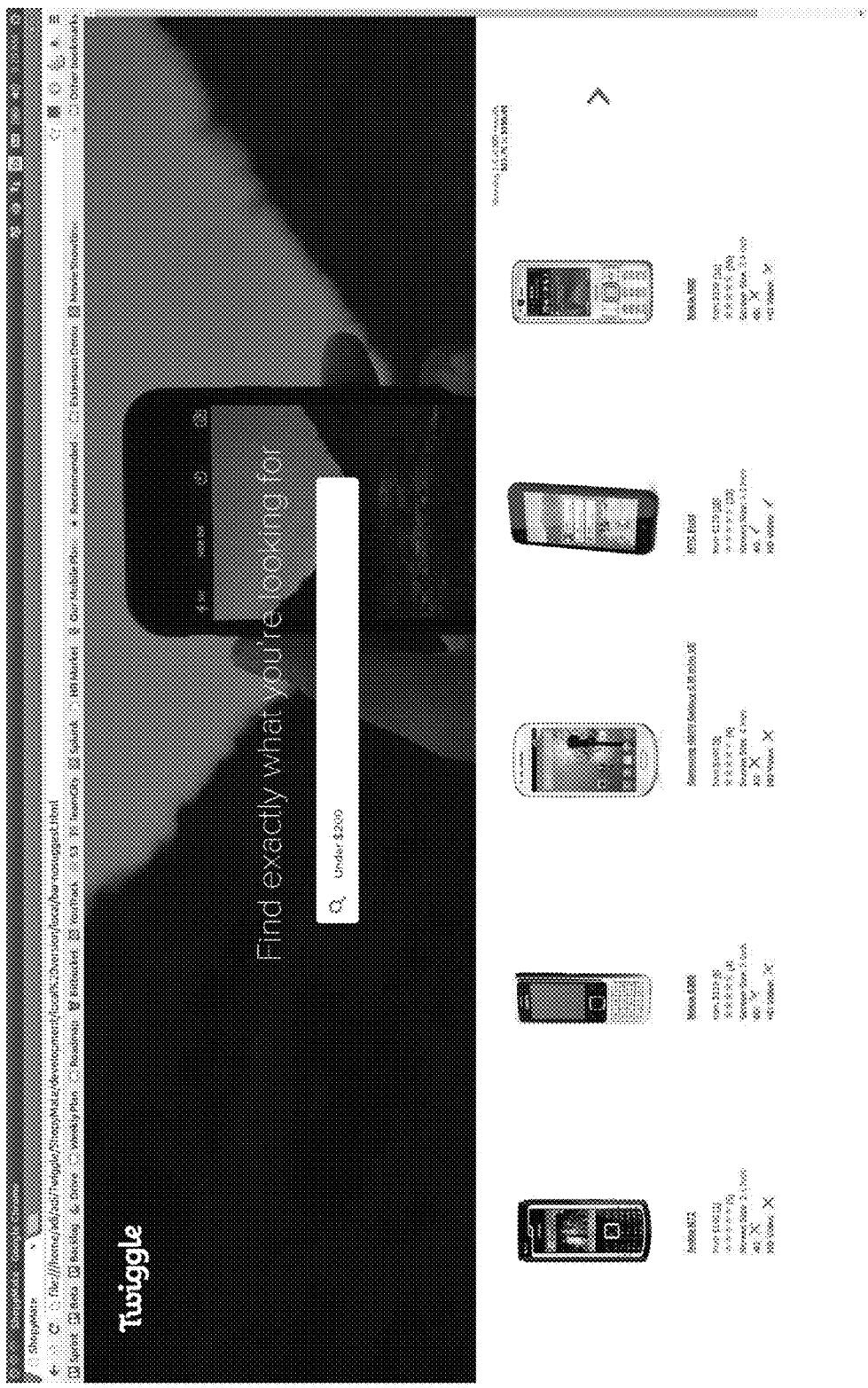
Figure 3C:
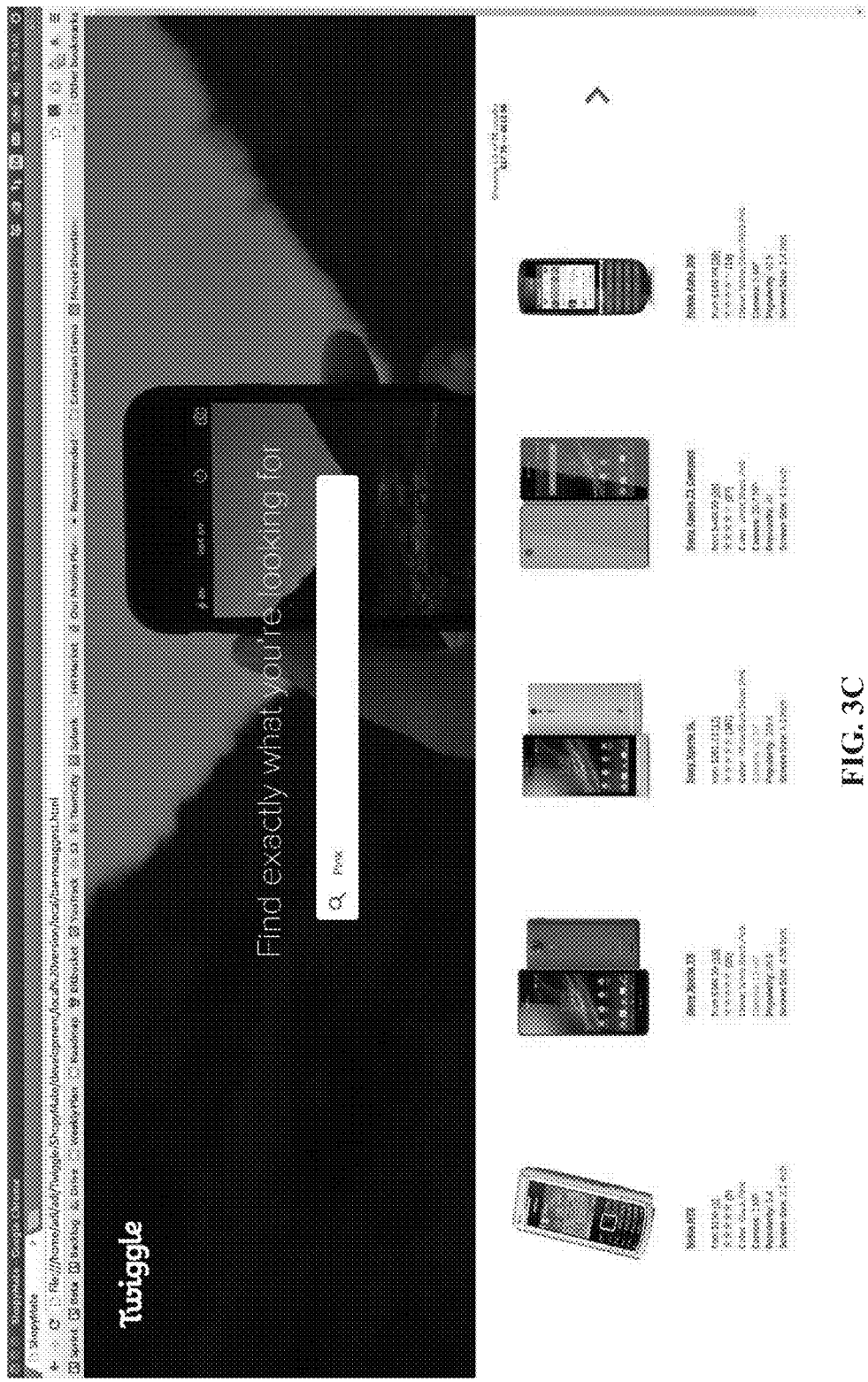

As shown at 101, the system 200 provides the client terminal 201 with instructions to present the GUI. The instructions may be provided to a browser running on the client and/or to an application hosted on and running on the client. For example, FIG. 3A depicts an exemplary browser control 301 having a search query input element, such as a text field.

Optionally, the GUI is presented in response to a selection of a multivariable object type, for example a selection of a product type or service type to search for. Exemplary multivariable object types are laptops, cellular devices, home appliances, printers, furniture, flight tickets, hotel rooms, TV sets, portable audio devices, tablets and/or any family of products or services which can be selected by a user input. For example, the GUI is presented as part of a search engine platform for ordering products or services which are related or not related to a selected multivariable object type. In use, after a multivariable object type is selected by the user or automatically of a selection module (e.g. based on a user profile, keyword search and/or browsing history analysis), the GUI is presented for allowing the user to input or define by selection a search query.

As shown at 102, a search query imputed by a user or an indicia otherwise acquired, for example from a personalizing module that defines search queries based on user profile or user preference estimation is acquired. The search query may be inputted as text term(s) for instance by selecting one or more selectable items.

Optionally, the control of the GUI has selectable items which allow defining a search query. In one example, the user selects a product type in an online shop, for example "laptops". This leads to the presentation of the GUI with a control having a text input field or selectable items allowing a user to input term of a search query better define object variables of the products from the "laptops" product type.

As shown at 103, a group of multivariable objects which comply with the search query are now identified, for instance using a search engine. These multivariable objects may be referred to herein as complying multivariable objects. Optionally, the group includes the best matches, for example 3, 5, 10, 15 or any intimidate or larger number of complying multivariable objects where a best match is decided as known in the art. Optionally, the group is identified by analyzing multivariable object records of a database. Each such record documents values of object variables of one multivariable object. The values are optionally extracted from an analysis of product or service specification, manually by users, user reviews, web content analysis (e.g. product reviews or social network posting), and/or by functions any of these values, for example functions combining specification data with user reviews.

Now, as shown at 104, the values of the object variables of records of members of the group of complying multivariable objects are analyzed to identify a group of differentiating object variables. Values of each differentiating object variable differentiates one of the complying multivariable objects from the others in a substantial manner, for example above a threshold or more than all or most of the non-differentiating object variables (optionally after normalization). For example, reference is now made to FIG. 4 which is a schematic illustration depicting a process of selecting differentiating object variables, according to some embodiments of the present invention. The figure depicts data flow or data usage connections between a plurality of functional blocks and a plurality of products records where P denotes a product, p denotes a number of object variables, optionally of a respective product or service category, $P_1\_P_n$ denotes a plurality of records (n) of products or services, optionally in a certain category. Each record documents a plurality of values of object variables of a certain product or service. The object variables may be physical or non-physical as described above. $P_1\_P_m$ denotes a set of records (m) of a plurality of products or services which comply with a current search query or indicia that define ranges or values, for example cellular phone which comply with a search query such as under 200$, at least 16 MB memory, less than 300 gram, sold in the US etc. PDC denotes a distribution calculator function for calculating distribution of values for an object variable that is documented in the records (e.g. calculating average, variance) where different object variables may have different weights and/or user dependent weights, for instance user behavior based weights. This allows normalizing difference values for determining which object variables have values which reflect a more substantial difference (e.g. distance or gap). Optionally, the PDC is executed at a preprocessing stage, before a search query is handled.

Figure 4:
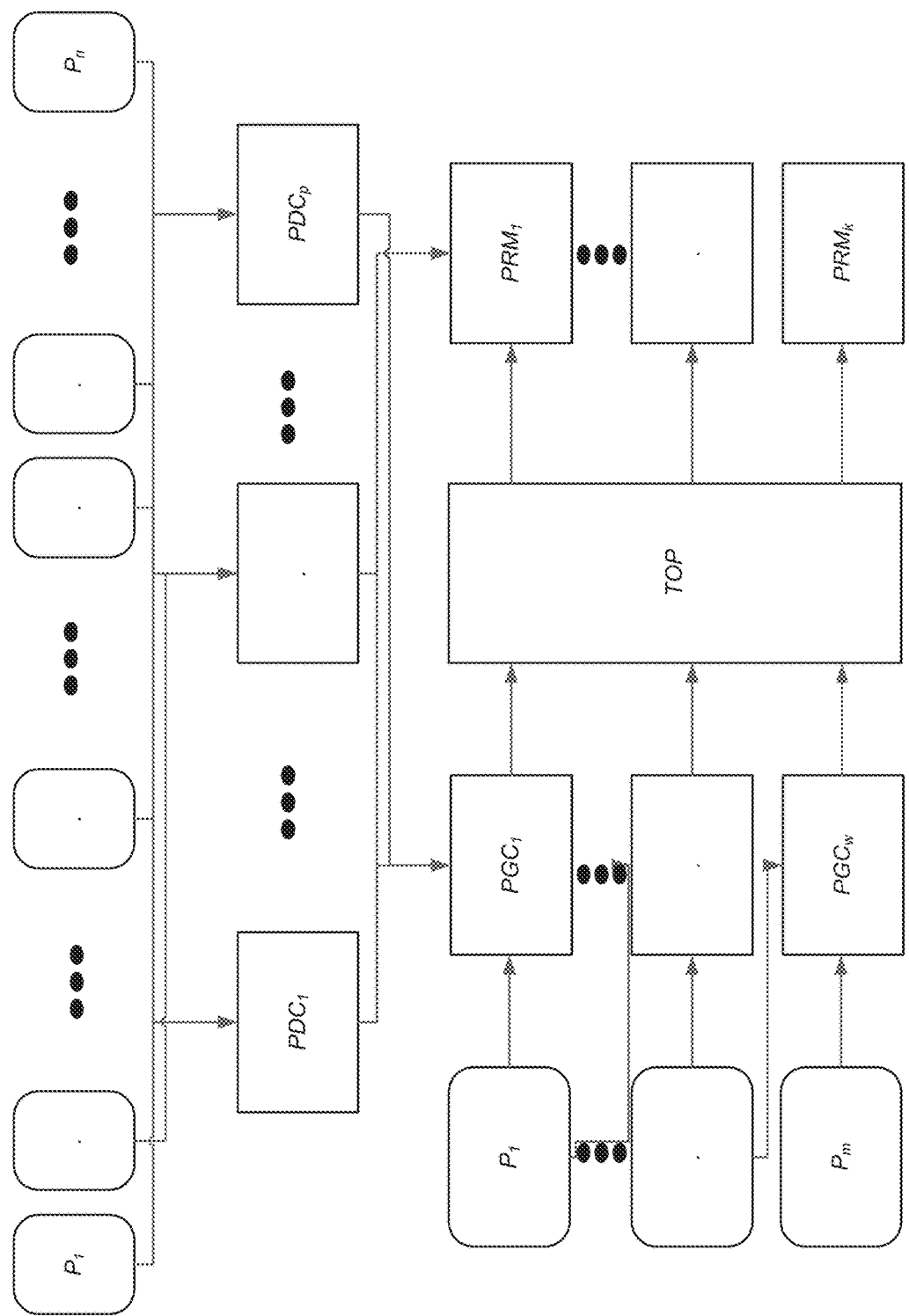
FIG. 4 is a schematic illustration depicting a process of selecting differentiating object variables, according to some embodiments of the present invention.

After a search query is received and a group of complying multivariable objects is identified gap/difference calculators are executed to identify the group of differentiating object variables. In FIG. 4, PGC denotes an object gap/difference calculator which calculates, for each value of an object variable of each one of the object variables of each one of $P_1\_P_m$, a gap/difference from the values of the same object variable of the other of $P_1\_P_m$. Data from $P_1\_P_m$ records is forwarded to the PDC functions for calculating distribution of values for an object variable among multivariable objects of a certain multivariable object category. The outcome of these functions is used, together with the gap/differences values of the PGC calculators to select differentiating object variables. In such a manner, the above allows identifying, optionally, per multivariable object, such as a product or service of $P_1\_P_m$, which object variable(s) (for example 1-3 per multivariable object of $P_1\_P_m$) have value(s) which differentiate the respective multivariable object from the other complying products or services ($P_1\_P_m$). Optionally, k object variable rendering calculators denoted herein as $PRM_1$-$PRM_k$ are used to instruct the rendering of the differentiating object variables.

For instance k object variables that maximize the following expression are calculated. For example, a software module or function, marked as TOP box/module in FIG. 4 is performing a top over all object variables (also referred to as features) where that values correspond to each object variable is given by the following:

$$\left( w_f * \text{sign}_f * \frac{\max(\text{value}(prd, f)) - \min(\text{value}(prd, f))}{std_f} \right) \quad \text{Equation 1}$$

where value denotes a value calculated by each PGC on the left bottom of FIG. 4, $w_f$ denotes a weight of feature f, and $\text{sign}_f$ denotes +1 or −1 according to a default directionality of the feature where +1 means that bigger values are better (e.g., in the feature 'screen resolution') while −1 means that lower values are better (e.g., in the feature 'weight' of a smartphone). max( ) and min( ) are defined over all the products prd that we currently compare (e.g. in FIG. 4, these products are $P_1, \ldots, P_m$ on the bottom left). value(prd, f) denote a value (or some transformation of the value) of feature f of product prd. A transformation of the original feature value may be used. For example, for a feature screen size which describes a diagonal of a smartphone screen, the value 'screen size'*'screen size' is used instead of the value 'screen size'. The motivation is that when screen sizes are compared by a human, reference is made to the areas of the screens rather than the diagonal length of the screen. $std_f$ denotes the standard deviation of feature f (the standard deviation is calculation over all values of that feature of all products in the category). In case a transformation is performed over the values of a feature (as above), the transformation is also applied while calculating the standard deviation.

For each feature f, the values $w_f$, $\text{sign}_f$, $std_f$ and also the transformation defined in the function value(prd, f) are all calculated by $PDC_f$ (see the top part of FIG. 4).

Figure 3D:
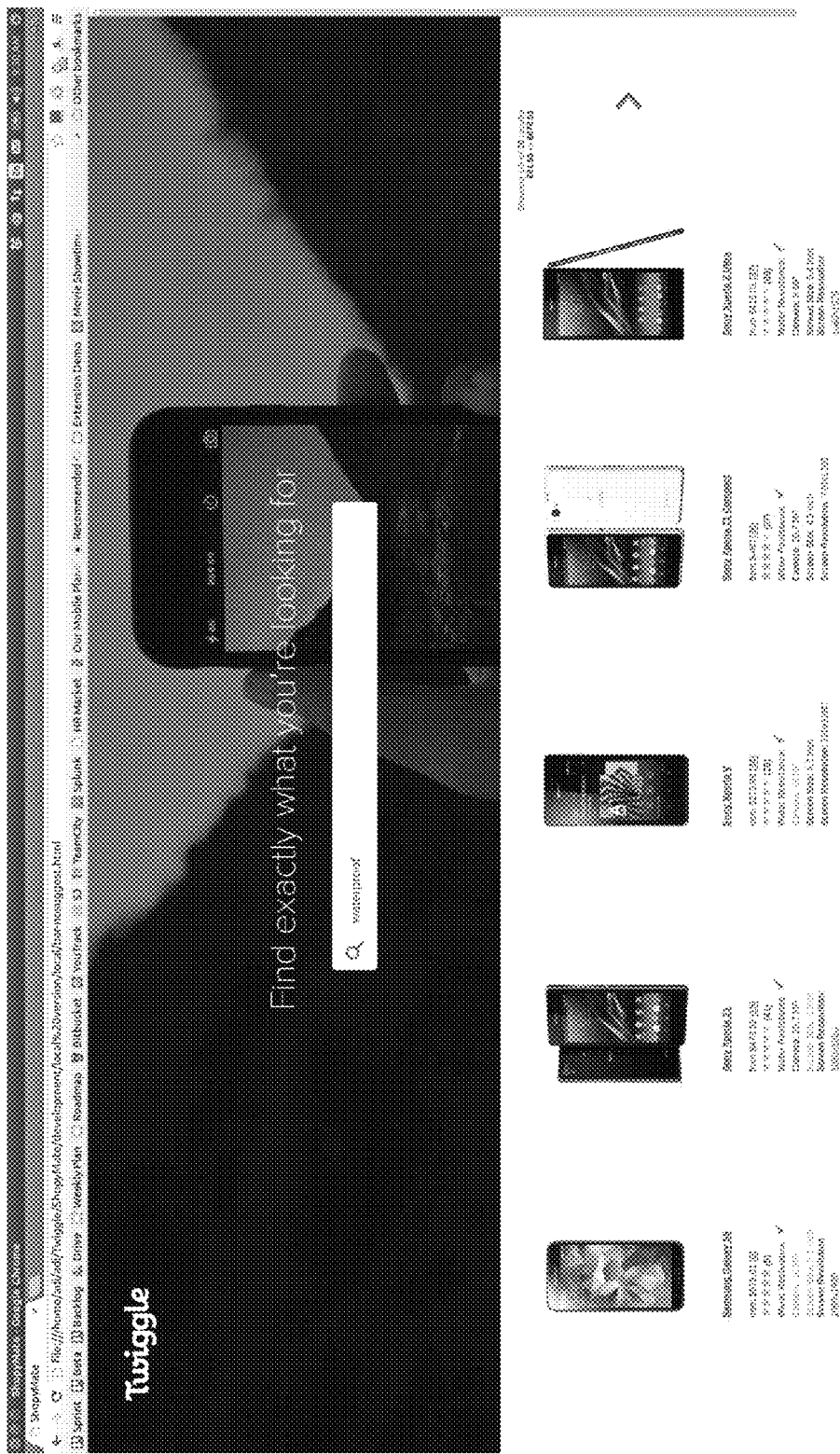

As depicted in FIG. 3D, the outcome of the above allows aggregating, for each product P, the (original) values of the top k features that were calculated by the TOP module as described above. A color is added for each feature f, where f is in the range 1, . . . , k, is calculated by the module $PRM_f$ (on the left side of FIG. 4). In an exemplary GUI implementation, colors are set as follows: for a product P the feature f a green color is applied when value(P, f)*$\text{sign}_f$>max (value(prd, f))−$\text{sign}_f$*$std_f$. A red color is applied when value (P, f)*$\text{sign}_f$<min(value(prd, f))+$\text{sign}_f$*$std_f$, and a yellow color is otherwise where terms are defined as defined for equation 1. In such a manner, the color is indicative of the positivity of the value. Instead of color another indication may be used, for instance an icon or relative font size.

As shown at 105, the values of some or all of the differentiating object variables of each of some or all of the complying multivariable objects is presented to the user who is associated with the search query, for example the user who inputted or otherwise defined the search query. For example see FIGS. 3A-3D which depict how different search queries induce the presentation of values of different differentiating object variables.

Optionally, each one of the object variables is associated with a weight. The selection of differentiating object variables takes into account the weights as factors such that different object variables which are selected according to their weight. Optionally, weights are set according to user preferences or profile. For example, the weight of each object variable is determined by the user, for example by allowing the user to: mark the selected object variable(s) as important and/or not important, input a weight value, order the selected object variables and/or the like.

Optionally, as shown at 106, a new search query can be defined by the user, for instance by adding a term that is based on one of the differentiating object variables to the current search query. For instance, the presented GUI may include selectable items which allow the user to select, optionally by a single click, finger tap, or gesture, a combination of one or more of the values of the differentiating object variables for updating the search query. For example, a selection may induce adding a range of values of a selected differentiating object variable to the search query for reselecting a group of complying multivariable objects. In another example, a selection may induce adding a negative term filtering a range of values of a selected differentiating object variable from the search query for reselecting a group of complying multivariable objects.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and devices will be developed and the scope of the term a processor, a network, and a unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of adapting a graphical user interface (GUI) that presents response to a search query on a display of a client terminal based in real time, comprising:
    selecting a group of multivariable objects which comply with a search query from a plurality of multivariable objects, each one of said plurality of multivariable objects having a plurality of object variable values each of one of a plurality of object variables of a product category to which said group of multivariable objects are related; and
    adapting a GUI to present a plurality of visual search result entries as a result to said search query by:
        calculating a plurality of normalized difference values, each said normalized difference value is calculated for one of said plurality of object variables by:
            gathering respective object variable values of said one of said plurality of object variables from members of said group of multivariable objects,
            calculating a distribution among the respective object variable values of said one of said plurality of object variables,
            identifying a minimum object variable value and a maximum object variable value among the respective object variable values of said group of multivariable objects,
            calculating a difference between said minimum object variable value and said maximum object variable value, and
            normalizing said difference according to said distribution to calculate respective said normalized difference value;
        identifying among said group of multivariable objects a plurality of differentiating object variables, each one of said plurality of differentiating object variables has a normalized difference value which is a member of a subgroup of normalized difference values which are higher than other normalized difference values from said plurality of normalized difference values;
        calculating a distribution among the respective object variable values of said one of said plurality of object variables,
        identifying a minimum object variable value and a maximum object variable value among the respective object variable values of said group of multivariable objects,
        updating said GUI to present said plurality of visual search result entries, each one of said visual search result entries comprises:
            at least one image of a member of said group of multivariable objects, and
            the respective values of said differentiating object variables of said member with a special indication associated with the respective values.

2. The method of claim 1, wherein each one of said plurality of object variables is associated with a weight; wherein said set of differentiating object variables are aggregated while taking into account respective said weight.

3. The method of claim 1, further comprising identifying a user selection indicative of at least a portion of said indication and refining said search query accordingly; further comprising repeating said method with said refined search query instead of said search query.

4. The method of claim 3, wherein said user selection is a single click or finger tap on one of a plurality of selectable items which are presented on said display to represent said plurality of multivariable objects.

5. The method of claim 1, wherein said search query is inputted by a user using said GUI.

6. The method of claim 1, wherein said plurality of multivariable objects are of a common product category.

7. The method of claim 1, wherein said plurality of object variables define a product in a product category.

8. The method of claim 1, wherein said plurality of object variables define a service in a service category.

9. The method of claim 1, further comprising receiving said search query a user via a search engine interface which is presented to said user; wherein said GUI is presented to said user in response to said search query.

10. The method of claim 1, further comprising receiving said search query is received from a software module which selects said plurality of multivariable objects for comparison; wherein said GUI is presented to a user accessing a webpage associated with said software module.

11. The method of claim 1, further comprising receiving said search query is received from an advertisement server which generates a graphical element with said plurality of multivariable objects and posts said graphical element in a webpage in response to a match with characteristics of a browsing user or a content in said webpage; wherein said GUI of said graphical element and presented when said webpage is accessed to using a browser.

12. The method of claim 1, wherein said GUI presents each of said plurality of normalized difference values with a positivity indications to indicate a negative value or a positive value to a respective multivariable object.

13. The method of claim 1, wherein said indication comprises selectable items which allow a user to redefine said search query by adding to or removing from said search query a respective said differentiating object variable.

14. The method of claim 1, wherein said GUI is rendered by a browser executed on a client terminal of a human user.

15. A system of generating a graphical user interface (GUI) that presents response to a search query on a display of a client terminal based in real time, comprising:
  an interface adapted to receive a search query from a user:
  at least one processor;
  a memory hosting a code, wherein the following code instructions of said code are executed by said at least one processor:
  code instructions for selecting a group of multivariable objects which comply with a search query from a plurality of multivariable objects, each one of said plurality of multivariable objects having a plurality of object variable values each of one of a plurality of object variables of a product category to which said group of multivariable objects are related; and
  code instructions for adapting a GUI to present a plurality of visual search result entries as a result to said search query by:
    calculating a plurality of normalized difference values, each said normalized difference value is calculated for one of said plurality of object variables by:
      gathering respective object variable values of said one of said plurality of object variables from members of said group of multivariable objects,
      calculating a distribution among the respective object variable values of said one of said plurality of object variables,
      identifying a minimum object variable value and a maximum object variable value among the respective object variable values of said group of multivariable objects,
      calculating a difference between said minimum object variable value and said maximum object variable value, and
      normalizing said difference according to said distribution to calculate respective said normalized difference value;
    identifying among said group of multivariable objects a plurality of differentiating object variables, each one of said plurality of differentiating object variables has a normalized difference value which is a member of a subgroup of normalized difference values which are higher than other normalized difference values from said plurality of normalized difference values;
    updating said GUI to present said plurality of visual search result entries, each one of said visual search result entries comprises:
      at least one image of a member of said group of multivariable objects, and
      the respective values of said differentiating object variables of said member with a special indication associated with the respective values.

16. The system of claim 15, wherein said interface, said at least one processor, and said memory are of a server which communicate with a plurality of client terminals via a network.

17. A non-transitory computer readable storage medium dynamically for adapting a graphical user interface (GUI) that presents response to a search query on a display of a client terminal based in real time, comprising instructions stored thereon, that when executed on a processor of a server in network communication with a plurality of client terminal perform the steps of:
  selecting a group of multivariable objects which comply with a search query from a plurality of multivariable objects, each one of said plurality of multivariable objects having a plurality of object variable values each of one of a plurality of object variables of a product category to which said group of multivariable objects are related; and
  adapting a GUI to present a plurality of visual search result entries as a result to said search query by:
    calculating a plurality of normalized difference values, each said normalized difference value is calculated for one of said plurality of object variables by:
      gathering respective object variable values of said one of said plurality of object variables from members of group of said multivariable objects,
      calculating a distribution among the respective object variable values of said one of said plurality of object variables,
      identifying a minimum object variable value and a maximum object variable value among the respective object variable values of said group of multivariable objects,
      calculating a difference between said minimum object variable value and said maximum object variable value, and
      normalizing said difference according to said distribution to calculate respective said normalized difference value;
    identifying among said group of multivariable objects a plurality of differentiating object variables, each one of said plurality of differentiating object variables has a normalized difference value which is a member of a subgroup of normalized difference values which are higher than other normalized difference values from said plurality of normalized difference values;
    updating said GUI to present said plurality of visual search result entries, each one of said visual search result entries comprises:
      at least one image of a member of said group of multivariable objects, and
      the respective values of said differentiating object variables of said member with a special indication associated with the respective values.

* * * * *